US009157570B2

United States Patent
Yu

(10) Patent No.: US 9,157,570 B2
(45) Date of Patent: Oct. 13, 2015

(54) WALL MOUNTING DEVICE AND WALL MOUNTING METHOD FOR LIQUID CRYSTAL DISPLAY

(75) Inventor: Gang Yu, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 140 days.

(21) Appl. No.: 13/702,274

(22) PCT Filed: Sep. 14, 2012

(86) PCT No.: PCT/CN2012/081374
§ 371 (c)(1),
(2), (4) Date: May 30, 2013

(87) PCT Pub. No.: WO2014/036757
PCT Pub. Date: Mar. 13, 2014

(65) Prior Publication Data
US 2014/0070060 A1    Mar. 13, 2014

(51) Int. Cl.
*F16M 13/02*    (2006.01)

(52) U.S. Cl.
CPC ........... *F16M 13/02* (2013.01); *Y10T 29/49947* (2015.01)

(58) Field of Classification Search
USPC ............... 248/317, 917, 918, 309.1, 231.91, 248/226.11, 205.1, 200, 475.1, 488, 489; 361/679.21, 681, FOR. 104; 348/825, 348/829, 844
See application file for complete search history.

(56) References Cited

U.S. PATENT DOCUMENTS

| | | | | |
|---|---|---|---|---|
| 6,930,731 B2 * | 8/2005 | Hirota et al. | ................... | 348/825 |
| 8,276,864 B2 * | 10/2012 | Ye et al. | ..................... | 248/287.1 |
| 2010/0276562 A1 * | 11/2010 | Nguyen | ......................... | 248/488 |
| 2011/0198461 A1 * | 8/2011 | Truckor | ..................... | 248/205.1 |
| 2011/0303810 A1 | 12/2011 | Xue | | |
| 2014/0268511 A1 * | 9/2014 | Martinez | .................. | 361/679.01 |

FOREIGN PATENT DOCUMENTS

| | | | |
|---|---|---|---|
| BR | 8902641 U2 * | 5/2011 | |
| CN | 2760450 Y | 6/2002 | |
| CN | 2888600 Y | 4/2007 | |
| CN | 200950359 Y | 9/2007 | |
| CN | 102135227 A | 7/2011 | |
| CN | 102537627 A | 7/2012 | |
| JP | 2008052133 A | 3/2008 | |

* cited by examiner

*Primary Examiner* — Alfred J Wujciak
(74) *Attorney, Agent, or Firm* — Andrew C. Cheng

(57) ABSTRACT

The present invention provides a wall mounting device and a wall mounting method for liquid crystal display. The wall mounting device includes a cross frame, brackets for supporting a bottom of a liquid crystal display, and connection sections connecting the cross frame and the brackets. The cross frame forms through holes corresponding to the mounting pegs of the liquid crystal display. To assemble, the bottom of the liquid crystal display is positioned on the brackets and the mounting pegs and the through holes are connected to each other so as to couple the liquid crystal display and the wall mounting device together. The wall mounting device for liquid crystal display of that uses brackets to reduce the number of mounting pegs used in the liquid crystal display so as effectively lower down the cost and enable the use of a thinner back frame for the liquid crystal display.

4 Claims, 5 Drawing Sheets

WALL MOUNTING DEVICE AND WALL MOUNTING METHOD FOR LIQUID CRYSTAL DISPLAY

BACKGROUND OF THE INVENTION

1. Field of the Invention

The present invention relates to the field of liquid crystal display, and in particular to a wall mounting device and a wall mounting method for liquid crystal display.

2. The Related Arts

Due to various advantages of being light and thin, consuming less power, and generating low radiation, liquid crystal displays have been widely used in a variety of fields. Conventionally, a liquid crystal display is retained in position by a base placed on a desktop. To reduce the amount of space occupied by a liquid crystal display and to achieve the purposes of aesthetics and decoration, a wall mounting device is provided to the liquid crystal display to allow the liquid crystal display to be directly mounted to a wall.

As shown in FIG. 1, in the structure of an existing design of liquid crystal display, a wall mounting structure is often composed of mounting pegs 200 that are riveted to a back frame 100 of a liquid crystal display. The mounting pegs 200 form internal threading, whereby through engagement made between bolts and the internal threading, wall mounting can be achieved. However, to enable the mounting pegs 200 to bear the weight of an entire set of television, the requirements for riveting operation, the thickness of the back frame 100, and design of the mounting pegs 200 must be greatly upgraded and this makes the design complicated.

SUMMARY OF THE INVENTION

An object of the present invention is to provide a wall mounting device for liquid crystal display, which uses brackets to reduce the number of mounting pegs used in the liquid crystal display and to enable the use of a thinner back frame for the liquid crystal display and a simpler design for wall mounting pegs, thereby effectively improving reliability of wall mounting arrangement and effectively lowering down cost.

Another object of the present invention is to provide a wall mounting method for liquid crystal display, of which the operation is easy, convenient, and efficient so as to reduce the installation cost.

To achieve the objects, the present invention provides a wall mounting device for liquid crystal display, which comprises: a cross frame, brackets for supporting a bottom of a liquid crystal display, and connection sections connecting the cross frame and the brackets. The cross frame forms through holes corresponding to the mounting pegs of the liquid crystal display. To assemble, the bottom of the liquid crystal display is positioned on the brackets and the mounting pegs and the through holes are connected to each other so as to couple the liquid crystal display and the wall mounting device together.

The brackets are each mounted perpendicularly to an end of the respective connection section that is distant from the cross frame.

The brackets and the connection sections are both of a number of two.

The two brackets are set in the same direction with respect to the connection sections.

The two connection sections are spaced from each other by a distance smaller than width of the liquid crystal display.

The cross frame, the brackets, and the connection sections are integrally formed together.

The present invention also provides a wall mounting method for liquid crystal display, which comprises the following steps:

Step 1: providing a liquid crystal display and a wall mounting device, wherein the wall mounting device comprises a cross frame, brackets for supporting a bottom of the liquid crystal display, and connection sections connecting the cross frame and the brackets, the cross frame forming through holes corresponding to the mounting pegs of the liquid crystal display;

Step 2: connecting the mounting pegs of the liquid crystal display and the through holes of the wall mounting device together with a bottom of the liquid crystal display being carried by the brackets to thereby mount the liquid crystal display to the wall mounting device; and Step 3: mounting the wall mounting device to a wall to thereby mount the liquid crystal display to the wall.

The brackets and the connection sections are of a number of two and the two connection sections are spaced from each other by a distance smaller than width of the liquid crystal display. The brackets are each mounted perpendicularly to an end of the respective connection section that is distant from the cross frame.

The cross frame, the brackets, and the connection section are integrally formed together.

The present invention also provides a wall mounting method for liquid crystal display, which comprises the following steps:

Step 101: providing a liquid crystal display and a wall mounting device, wherein the wall mounting device comprises a cross frame, brackets for supporting a bottom of the liquid crystal display, and connection sections connecting the cross frame and the brackets, the cross frame forming through holes corresponding to the mounting pegs of the liquid crystal display, the brackets and the connection sections being both of a number of two, the two connection sections being spaced from each other by a distance smaller than width of the liquid crystal display, the brackets being each mounted perpendicularly to an end of the respective connection section that is distant from the cross frame;

Step 2: mounting the wall mounting device to a wall; and

Step 3: connecting the mounting pegs of the liquid crystal display and the through holes of the wall mounting device together with a bottom of the liquid crystal display carried by the brackets to thereby mount the liquid crystal display to a wall by the wall mounting device;

wherein the cross frame, the brackets, and the connection sections are integrally formed together.

The efficacy of the present invention is that the present invention provides a wall mounting structure of liquid crystal display, which uses brackets to support a bottom of the liquid crystal display so as to reduce the number of mounting pegs used in the liquid crystal display, effectively lower down the cost, and enable the use of a thinner back frame for the liquid crystal display and a simpler design for the mounting peg thereby effectively improving the reliability of wall mounting arrangement. The present invention also provides a wall mounting method for liquid crystal display, which uses a wall mounting device to realize a wall mounting operation of a liquid crystal display simple, easy, and efficient and also reducing installation cost.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
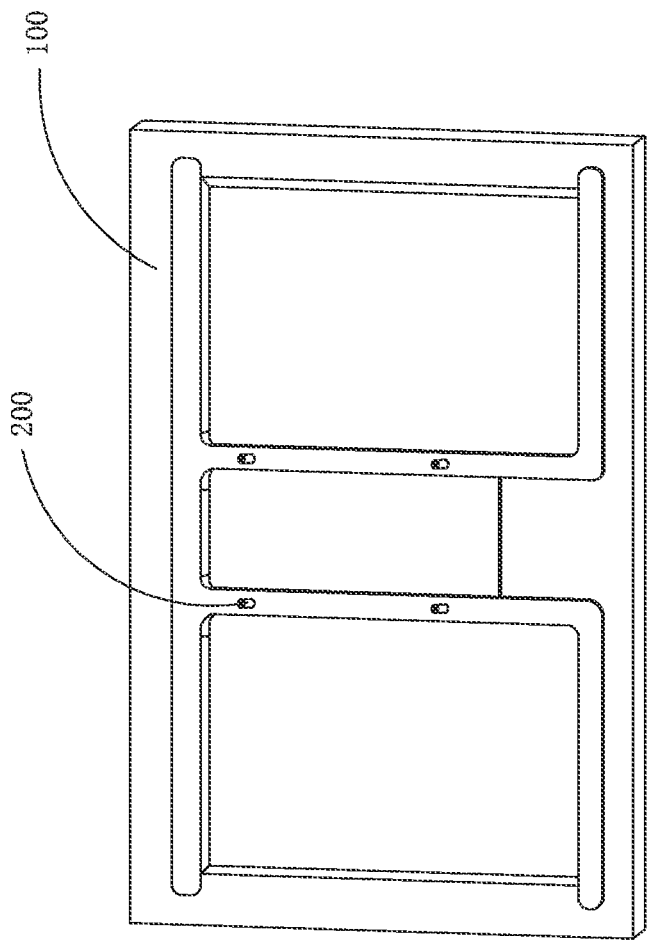
FIG. 1 is a schematic view showing the structure of a conventional liquid crystal display wall mounting peg.
Figure 2:
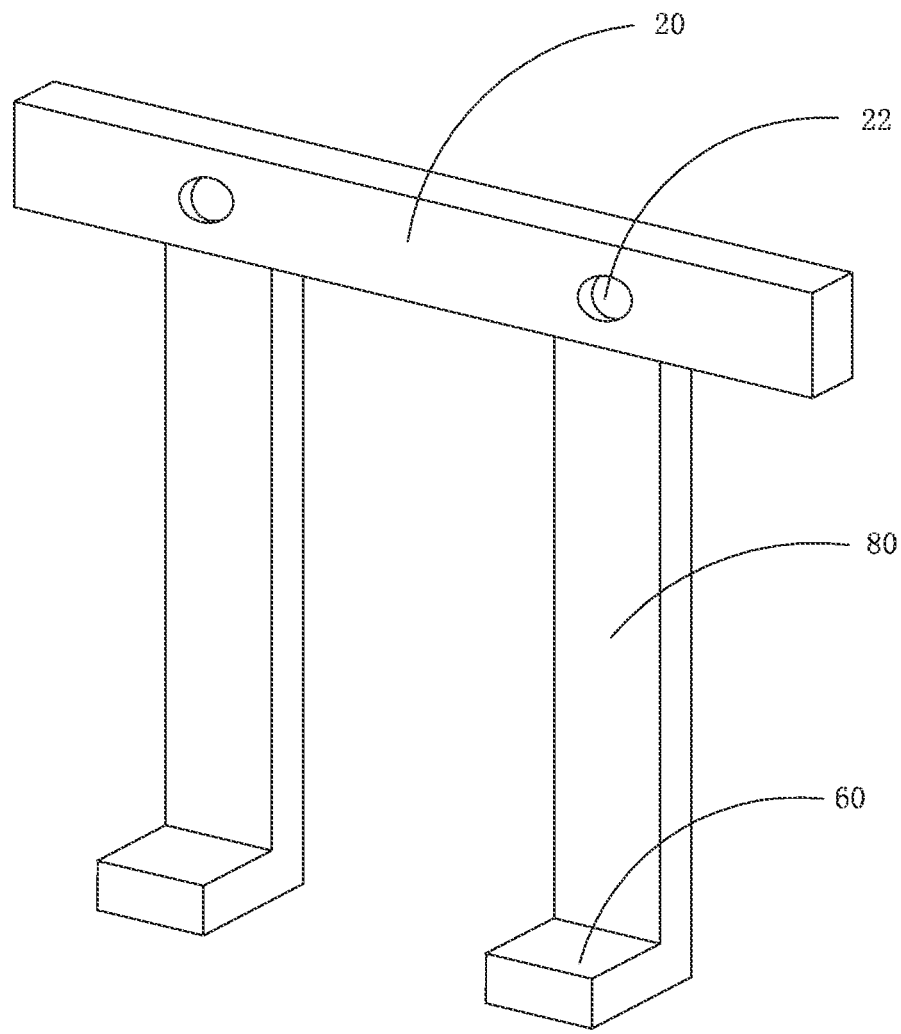
FIG. 2 is a schematic view showing a wall mounting device for liquid crystal display according to the present invention.
Figure 3:
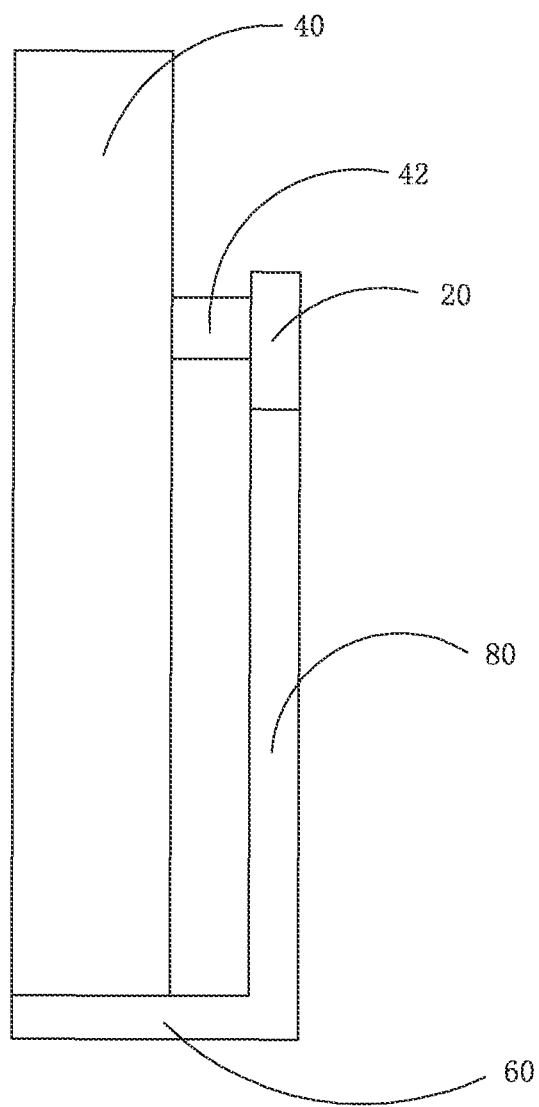
FIG. 3 is a schematic view showing arrangement of the wall mounting device of the present invention and a liquid crystal display.

Referring to FIGS. 2 and 3, the present invention provides a wall mounting device for liquid crystal display, which comprises: a cross frame 20, brackets 60 for supporting a bottom of a liquid crystal display 40, and connection sections 80 connecting the cross frame 20 and the brackets 60. The cross frame 20 forms through holes 22 corresponding to mounting pegs 42 attached to the liquid crystal display 40. To assemble, the bottom of the liquid crystal display 40 is positioned on and carried by the brackets 60 and the mounting pegs 42 and the through holes 22 are connected to each other so as to couple the liquid crystal display 40 and the wall mounting device together. Since the brackets 60 carry a fraction of the weight of the liquid crystal display 40, the mounting pegs 42 only carry a reduced weight and are thus allowed to use a simpler mounting peg design thereby lowering down the manufacture cost.

Preferably, the brackets 60 and the connection section 80 are both of a number of two. The brackets 60 are mounted perpendicularly to an end of the connection sections 80 that is distant from the cross frame 20. The two brackets 60 are set in the same direction with respect to the connection sections 80 and both are arranged in a direction toward the liquid crystal display 40.

To support the liquid crystal display 40, the two connection sections 80 are spaced from each other by a distance that is smaller than width of the liquid crystal display 40. Furthermore, the two brackets 60 are spaced from each other by a distance smaller than the width of the liquid crystal display 40.

The cross frame 20, the brackets 60, and the connection sections 80, after being manufactured separately, are coupled to each other through screws. Preferably, the cross frame 20, the brackets 60, and the connection sections 80 are integrally formed together.

Figure 4:
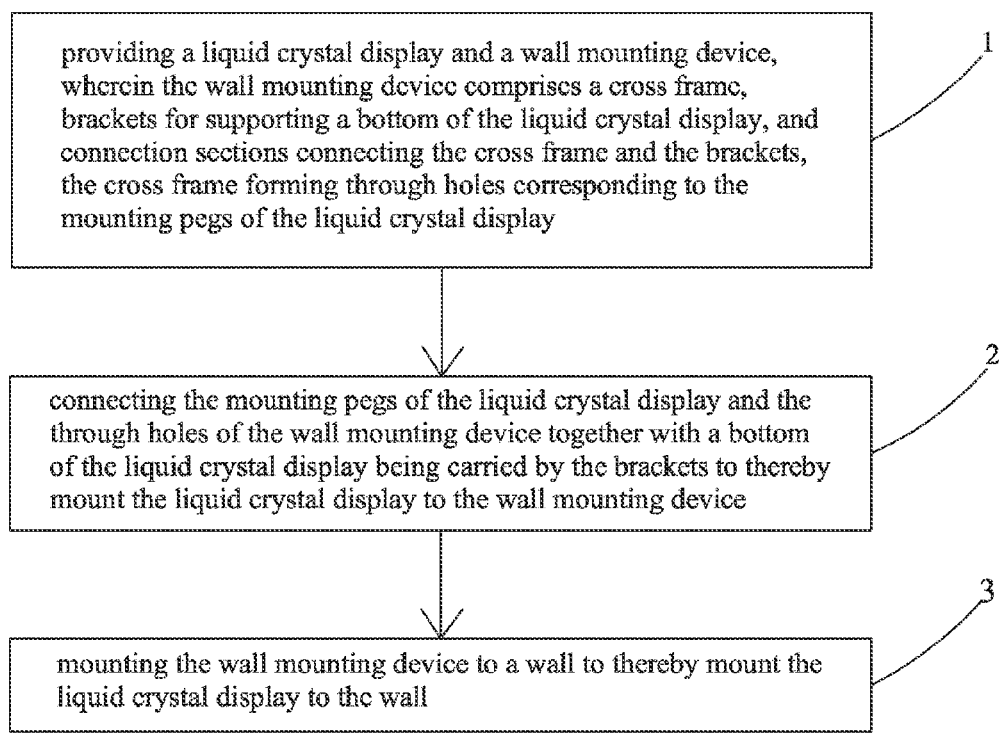
FIG. 4 is a flow chart showing a wall mounting method for liquid crystal display according to a preferred embodiment of the present invention.

Referring to FIGS. 3 and 4, the present invention also provides a wall mounting method for a liquid crystal display, which comprises the following steps:

Step 1: providing a liquid crystal display and a wall mounting device.

The wall mounting device comprises a cross frame 20, brackets 60 for supporting a bottom of the liquid crystal display 40, and connection sections 80 connecting the cross frame 20 and the brackets 60. The cross frame 20 forms through holes 22 corresponding to the mounting pegs 42 of the liquid crystal display 40. Preferably, the brackets 60 and the connection sections 80 are both of a number of two. The brackets 60 are mounted perpendicularly to an end of the connection sections 80 that is distant from the cross frame 20. The cross frame 20, the brackets 60, and the connection sections 80 can be manufactured separately and are then coupled together through screws. Preferably, the cross frame 20, the brackets 60, and the connection sections 80 are integrally formed together.

Step 2: connecting the mounting pegs 42 of the liquid crystal display and the through holes 22 of the wall mounting device together with a bottom of the liquid crystal display 40 being carried by the brackets 60 to thereby mount the liquid crystal display 40 to the wall mounting device.

The two brackets 60 are set in the same direction with respect to the connection sections 80 and both are arranged in a direction toward the liquid crystal display 40. The two connection sections 80 are spaced from each other by a distance that is smaller than width of the liquid crystal display 40. Furthermore, the two brackets 60 are spaced from each other by a distance smaller than the width of the liquid crystal display 40.

Step 3: mounting the wall mounting device to a wall to thereby mount the liquid crystal display 40 to the wall.

Figure 5:
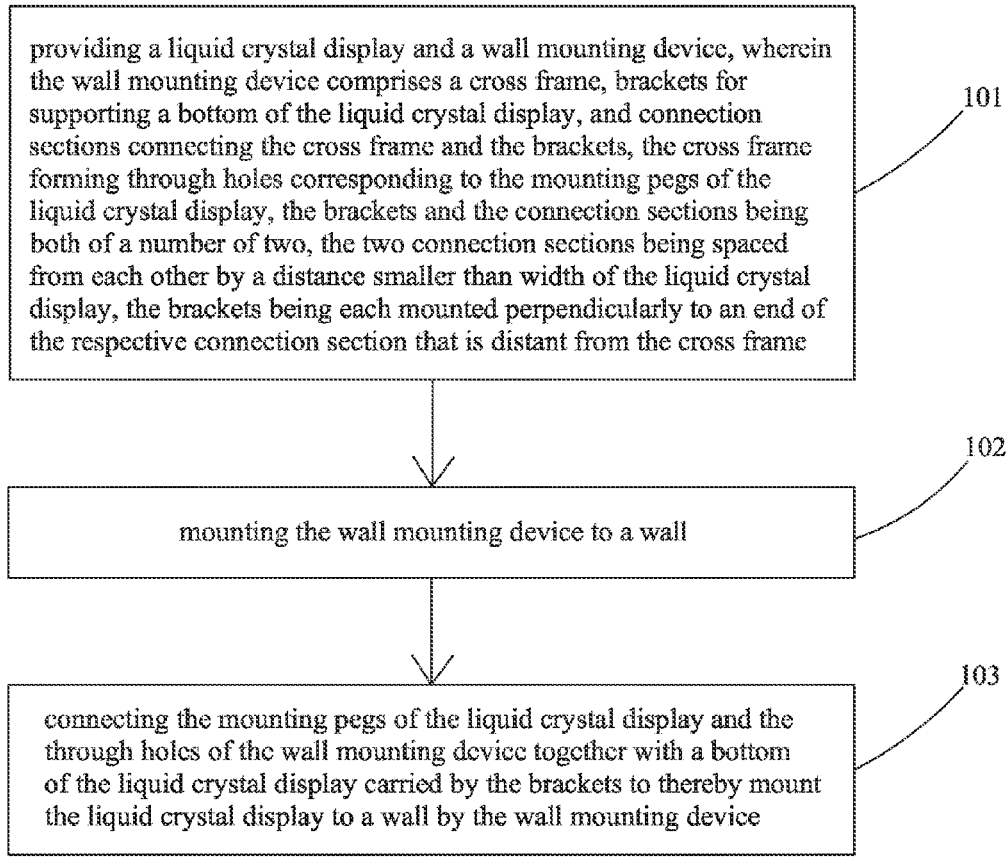
FIG. 5 is a flow chart showing a wall mounting method for liquid crystal display according to another preferred embodiment of the present invention.

Referring to FIGS. 3 and 5, the present invention also provides a wall mounting method for liquid crystal display, comprising the following steps:

Step 101: providing a liquid crystal display and a wall mounting device.

The wall mounting device comprises a cross frame 20, brackets 60 for supporting a bottom of the liquid crystal display 40, and connection sections 80 connecting the cross frame 20 and the brackets 60. The cross frame 20 forms through holes 22 corresponding to mounting pegs 42 of the liquid crystal display 40. Preferably, the brackets 60 and the connection sections 80 are both of a number of two. The brackets 60 are mounted perpendicularly to an end of the connection sections 80 that is distant from the cross frame 20. The cross frame 20, the brackets 60, and the connection sections 80 can be manufactured separately and are then coupled together through screws. Preferably, the cross frame 20, the brackets 60, and the connection sections 80 are integrally formed together.

Step 102: mounting the wall mounting device to a wall.

Any known mounting methods can be used to mount the wall mounting device to a wall. Preferably, a predetermined gap is set between the cross frame 20 and the wall to allow a subsequent operation of mounting the liquid crystal display 40 to the wall mounting device.

Step 103: connecting the mounting pegs 42 of the liquid crystal display 40 and the through holes 22 of the wall mounting device together with a bottom of the liquid crystal display 40 being carried by the brackets 60 to thereby mount the liquid crystal display 40 to a wall by the wall mounting device.

The two brackets 60 are set in the same direction with respect to the connection sections 80 and both are arranged in a direction toward the liquid crystal display 40. The two connection sections 80 are spaced from each other by a distance that is smaller than width of the liquid crystal display 40. Furthermore, the two brackets 60 are spaced from each other by a distance smaller than the width of the liquid crystal display 40.

In summary, the present invention provides a wall mounting structure of liquid crystal display, which uses brackets to reduce the number of mounting pegs used in the liquid crystal display so as to effectively lower down the cost and enable the use of a thinner back frame for the liquid crystal display and a simpler design of mounting peg thereby effectively improving the reliability of wall mounting arrangement. The present invention also provides a wall mounting method for liquid crystal display, which uses a wall mounting device to realize a wall mounting operation of a liquid crystal display simple, easy, and efficient and also reducing installation cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A wall mounting method for a liquid crystal display, comprising the following steps:
    (1) providing a liquid crystal display that has a bottom and a top portion comprising mounting pegs mounted thereto and a wall mounting device, wherein the wall mounting device comprises a cross frame extending in a horizontal direction, two brackets for supporting the bottom of the liquid crystal display, and two connection sections mounted to and extending vertically from the cross frame and having distal free ends from which the brackets respectively and perpendicularly extend, so that the brackets are spaced from and opposite to the cross frame and the cross frame and the brackets are connected by the connection sections to each other in such a way that the brackets are substantially perpendicular to the horizontal direction of the cross frame and the connection sections, the two connection sections being spaced and separated from each other in the horizontal direction, the cross frame forming through holes corresponding to the mounting pegs of the liquid crystal display;
    (2) connecting the mounting pegs of the liquid crystal display and the through holes of the wall mounting device together with the bottom of the liquid crystal display being carried and supported by the brackets to thereby mount the liquid crystal display to the wall mounting device; and
    (3) mounting the wall mounting device to a wall to thereby mount the liquid crystal display to the wall.

2. The wall mounting method for liquid crystal display as claimed in claim 1, wherein the two connection sections are spaced from each other by a distance smaller than a width of the liquid crystal display.

3. The wall mounting method for liquid crystal display as claimed in claim 1, wherein the cross frame, the brackets, and the connection section are integrally formed together.

4. A wall mounting method for liquid crystal display, comprising the following steps:
    (1) providing a liquid crystal display that has a bottom and a top portion comprising mounting pegs mounted thereto and a wall mounting device, wherein the wall mounting device comprises a cross frame extending in a horizontal direction, two brackets for supporting the bottom of the liquid crystal display, and two connection sections mounted to and extending vertically from the cross frame and having distal free ends from which the brackets respectively and perpendicularly extend, so that the brackets are spaced from and opposite to the cross frame and the cross frame and the brackets are connected by the connection sections to each other in such a way that the brackets are substantially perpendicular to the horizontal direction of the cross frame and the connection sections, the two connection sections being spaced and separated from each other in the horizontal direction, the cross frame forming through holes corresponding to the mounting pegs of the liquid crystal display;
    (2) mounting the wall mounting device to a wall; and
    (3) connecting the mounting pegs of the liquid crystal display and the through holes of the wall mounting device together with the bottom of the liquid crystal display carried and supported by the brackets to thereby mount the liquid crystal display to a wall by the wall mounting device;
    wherein the cross frame, the brackets, and the connection sections are integrally formed together.

* * * * *